(12) United States Patent
Tachimori et al.

(10) Patent No.: US 6,978,237 B2
(45) Date of Patent: Dec. 20, 2005

(54) SPEECH RECOGNITION SUPPORT METHOD AND APPARATUS

(75) Inventors: Mitsuyoshi Tachimori, Kanagawa-ken (JP); Hiroshi Kanazawa, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/687,707

(22) Filed: Oct. 20, 2003

(65) Prior Publication Data

US 2004/0083108 A1    Apr. 29, 2004

Related U.S. Application Data

(63) Continuation of application No. 09/606,150, filed on Jun. 29, 2000, now Pat. No. 6,718,304.

(30) Foreign Application Priority Data

Jun. 30, 1999    (JP)    ................... 11-185859

(51) Int. Cl.$^7$ .......................... G10L 15/22; G01C 21/26
(52) U.S. Cl. .................. 704/238; 701/211; 704/270
(58) Field of Search .................. 704/231, 236, 704/238, 240, 270, 275; 701/200, 201, 207, 701/208, 210, 211, 212

(56) References Cited

U.S. PATENT DOCUMENTS

| | | | | |
|---|---|---|---|---|
| 5,274,560 A | * | 12/1993 | LaRue | 701/202 |
| 5,566,272 A | * | 10/1996 | Brems et al. | 704/231 |
| 6,253,174 B1 | * | 6/2001 | Ishii et al. | 704/231 |
| 6,349,257 B1 | * | 2/2002 | Liu et al. | 701/200 |
| 6,526,135 B1 | * | 2/2003 | Paxson | 379/218.01 |
| 6,680,694 B1 | * | 1/2004 | Knockeart et al. | 701/209 |
| 6,707,421 B1 | * | 3/2004 | Drury et al. | 701/208 |
| 6,718,304 B1 | * | 4/2004 | Tachimori et al. | 704/236 |
| 6,732,077 B1 | * | 5/2004 | Gilbert et al. | 704/270 |
| 6,873,850 B2 | * | 3/2005 | Dowling et al. | 455/456.1 |
| 6,895,117 B1 | * | 5/2005 | Klemm et al. | 382/226 |

* cited by examiner

*Primary Examiner*—Martin Lemer
(74) *Attorney, Agent, or Firm*—Finnegan, Henderson, Farabow, Garrett & Dunner, L.L.P.

(57) ABSTRACT

A speech recognition support method in a system to retrieve a map in response to a user's input speech. The user's speech is recognized and a recognition result is obtained. If the recognition result represents a point on the map, a distance between the point and a base point on the map is calculated. The distance is decided to be above a threshold or not. If the distance is above the threshold, an inquiry to confirm whether the recognition result is correct is output to the user.

5 Claims, 8 Drawing Sheets

FIG. 3

| PLACE NAME | POSITION COORDINATE |
|---|---|
| BASE POINT | (100, 100) |
| EAST PARK | (200, 150) |
| CENTER MALL | (50, 130) |
| ALPHA HOTEL | (10, 80) |
| CITY HALL | (20, 70) |
| WILSON CONDOMINIUM | (120, 200) |
| BROWN CONDOMINIUM | (110, 150) |
| ⋮ | ⋮ |

SPEECH RECOGNITION SUPPORT METHOD AND APPARATUS

This is a continuation of application Ser. No. 09/606,150, filed Jun. 29, 2000 now U.S. Pat. No. 6,718,304 which is incorporated in its entirety herein by reference. This application is also based upon and claims the benefit of priority from the prior Japanese Patent Application No. 11-185859, filed on Jun. 30, 1999.

FIELD OF THE INVENTION

The present invention relates to a speech recognition support method and an apparatus for supporting a system to retrieve a map in response to a user's input speech.

BACKGROUND OF THE INVENTION

In a system to retrieve a map by using a speech command such as a car-navigation system, a user often speaks a name of place or institution in an area of retrieval object. In the car-navigation system, a plurality of road-maps are previously stored in a map-database. The user's utterance word speech is recognized as a place name or an institution name. A map in which the place name or the institution name is included is retrieved from the map-database and presented to the user. In this case, if a point of the place name or the institution name as the recognition result is far from an area on the map, a possibility that the user's input speech is erroneously recognized is high. Accordingly, if the system unconditionally executes an operation for this erroneous recognition result, the error operation is often occurred as a result. For example, if a map including a point of the erroneous recognition result is retrieved from the map-database and presented to the user during driving a car, this presentation is useless for the user's driving.

Therefore, as a present method in the car-navigation system to retrieve a map in response to a speech command, a large number of place names described in the map-database are hierarchically arranged from high-level to low level such as state, city, town, street.

The user speaks place names from a high level to a low level in order. In short, while the user speaks the place names from the high level to the low level, the map of retrieval object is further limited as the small area in the map-database. However, assume that the user speaks a name place of a high level and the area of retrieval object is limited to some extent. In the next step, the place name of the user's input utterance is limited to place names included in the area of retrieval object. In this case, if the user wishes to input a place name outside the area of retrieval object, this input processing of the system is returned to the highest level (for example, state) and the user must input the place name of the highest level (state name) again. This operation is troublesome for the user.

In this way, in the car-navigation system to retrieve a map by the user's input speech command, the large number of place names in the maps are hierarchically arranged and the map of the retrieval area is limited by the place name of the user's utterance from high level to low level. However, in this condition that the map of the retrieval area is limited to some extent, if the user utters a place name outside the retrieval area in order to retrieve another map, the user must release this limitation of the retrieval area in the system and the user must utter a place name of the highest level again. This operation is very troublesome for the user.

SUMMARY OF THE INVENTION

It is an object of the present invention to provide a speech recognition support method and an apparatus not to limit the retrieval area to input the utterance of the place name and to avoid an unnecessary operation by erroneous recognition of the utterance.

According to the present invention, there is provided a speech recognition support method applied to a system to retrieve a map in response to a user's input speech, comprising the steps of: assigning a recognition result to the user's input speech; calculating, if the recognition result of the user's input speech represents a point on the map, a distance between the point and a base point on the map; deciding whether the distance is above a threshold; and outputting, if the distance is above the threshold, an inquiry to the user to confirm whether the recognition result is correct.

Further in accordance with the present invention, there is also provided a speech recognition support method applied to a system to retrieve a map in response to a user's input speech, comprising the steps of: recognizing the user's input speech; obtaining a plurality of recognition candidates as the recognition result; extracting, if the first candidate in the plurality of recognition candidates represents a point on the map, the recognition candidates each representing a point on the map from the plurality of recognition candidates; calculating a score of each of the extracted recognition candidates by adding a function value of distance between a point of each recognition candidate and a base point on the map to a value of similarity degree between the each recognition candidate and the input speech; deciding whether the distance of the recognition candidate of the highest score is above a threshold; and outputting, if the distance is above the threshold, an inquiry to the user to confirm whether the recognition candidates of predetermined number of higher score are correct.

Further in accordance with the present invention, there is also provided a speech recognition support apparatus for retrieving a map in response to a user's input speech, comprising: a speech recognition unit configured to assign a recognition result to the user's input speech; a distance decision unit configured to calculate a distance between a point of the recognition result and a base point on the map if the recognition result represents a point on the map, and to decide whether the distance is above a threshold; and a response generation unit configured to generate an inquiry to the user to confirm whether the recognition result is correct if the distance is above the threshold.

Further in accordance with the present invention, there is also provided a speech recognition support apparatus for retrieving a map in response to a user's input speech, comprising: a speech recognition unit configured to recognize the user's input speech and to obtain a plurality of recognition candidates as the recognition result; a distance decision unit configured to extract the recognition candidates each representing a point on the map from the plurality of recognition candidates if the first candidate represents a point on the map, to calculate a score of each of the extracted recognition candidates by adding a function value of distance between a point of each recognition candidate and a base point on the map to a similarity degree between the each recognition candidate and the input speech, and to decide whether the distance of the recognition candidate of the highest score is above a threshold; and a response generation unit configured to generate an inquiry to the user to confirm whether the recognition candidates of predetermined number of higher score are correct if the distance is above the threshold.

Further in accordance with the present invention, there is also provided a computer readable memory containing computer readable instructions in a system to retrieve a map in response to a user's input speech; comprising: instruction means for causing a computer to assign a recognition result to the user's input speech; instruction means for causing a computer to calculate, if the recognition result of the user's input speech represents a point on the map, a distance between the point and a base point on the map; instruction means for causing a computer to decide whether the distance is above a threshold; and instruction means for causing a computer to output, if the distance is above the threshold, an inquiry to the user to confirm whether the recognition result is correct.

Further in accordance with the present invention, there is also provided a computer readable memory containing computer readable instructions in a system to retrieve a map in response to a user's input speech, comprising: instruction means for causing a computer to recognize the user's input speech; instruction means for causing a computer to obtain a plurality of recognition candidates as the recognition result; instruction means for causing a computer to extract, if the first candidate in the plurality of recognition candidates represents a point on the map, the recognition candidates each representing a point on the map from the plurality of recognition candidates; instruction means for causing a computer to calculate a score of each of the extracted recognition candidates by adding a function value of distance between a point of each recognition candidate and a base point on the map to a value of similarity degree between each recognition candidate and the input speech; instruction means for causing a computer to decide whether the distance of the recognition candidate of the highest score is above a threshold, and instruction means for causing a computer to output to the user, if the distance is above the threshold, an inquiry to confirm whether the recognition candidates of predetermined number of higher score are correct.

BRIEF DESCRIPTION OF THE DRAWINGS

FIG. 3 is a schematic diagram of a correspondence table to store a place and a position coordinate on the map.

DETAILED DESCRIPTION OF THE PREFERRED EMBODIMENTS

Figure 1:
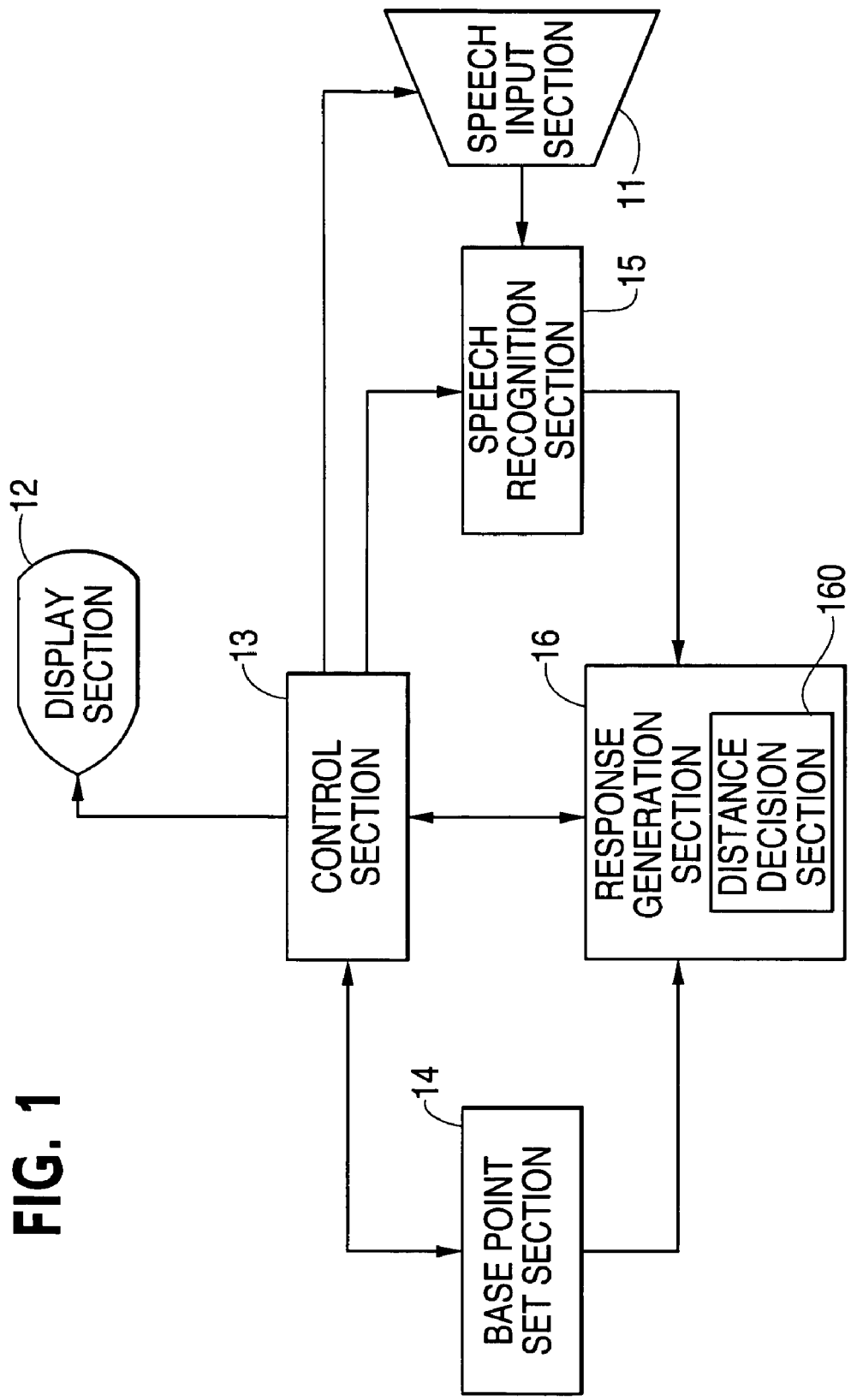
FIG. 1 is a block diagram of a speech recognition support apparatus according to a first embodiment of the present invention.

Hereinafter, embodiments of the present invention will be explained by referring to the drawings. FIG. 1 is a block diagram of the speech recognition support apparatus according to the first embodiment of the present invention. In the first embodiment, a speech recognition system to retrieve a map in response to a user's utterance (speech command) is applied as a car-navigation system. In order to briefly explain, object vocabulary of speech recognition is limited to the place name and the institution name in a map-database. Each vocabulary includes a coordinate representing the geographical position on the map. In FIG. 1, the speech recognition support apparatus includes a speech input section 11, a display section 12, a control section 13, a base point set section 14, a speech recognition section 15, and a response generation section 16. The response generation section 16 includes a distance decision section 160.

The control section 13 controls all sections of the car-navigation system, such as a speech input from the speech input section 11 (for example, a microphone), a display of the map on the display section 12, a set and a change of various kinds of parameters, and a control of database to store necessary information.

The base point set section 14 sets and stores coordinate data (position coordinate) of a base point (a place point as a base of map retrieval) on the map. As an initial value of the base point, a present position of the car-navigation system, or a position coordinate of a predetermined place (the place aimed) is used. This position coordinate of the base point is changed by the user's request or autonomous working of the system. Furthermore, the position coordinate of the base point is calculated by referring to a latitude and a longitude obtained from GPS (Global Positioning System), a previous position coordinate registered in the database, or a predetermined position on the map.

The speech recognition section 15 accepts the input speech from the speech input section 11 (consisting of a microphone and an A/D converter) controlled by the control section 13, acoustically analyzes the input speech, and extracts a feature pattern sequence. Then, the speech recognition section 15 calculates a similarity degree between the feature pattern sequence and a standard feature pattern (standard model) of each recognition vocabulary and outputs one or a plurality of standard models as the recognition result. In this case, if the recognition result is not obtained because of failure of detection of the speech, the speech recognition section 15 outputs the failure of the recognition. In the first embodiment, the speech recognition section 15 outputs one recognition result representing a place or an institution on the map.

Figure 2:
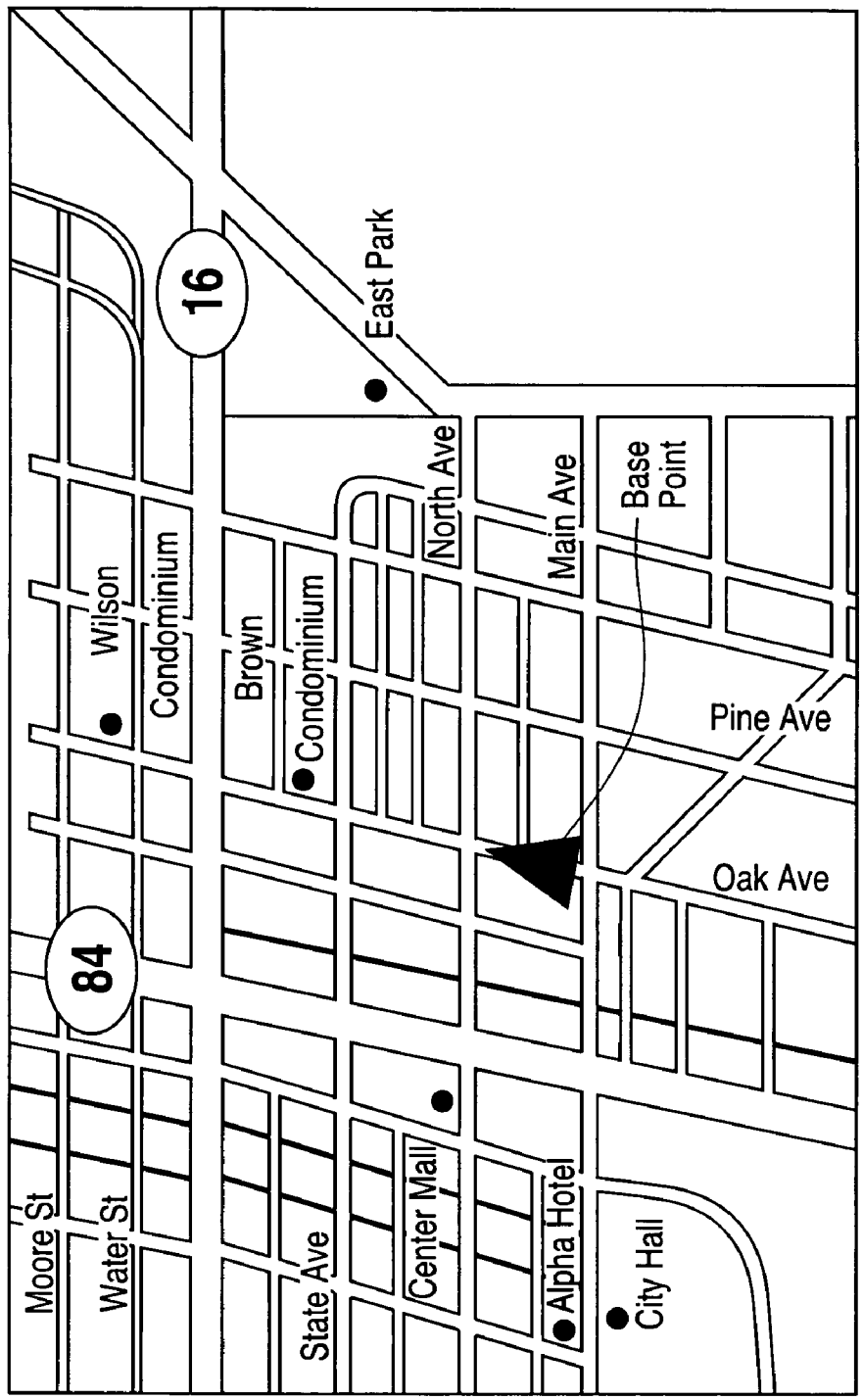
FIG. 2 is a schematic diagram of a display map including a base point.
Figure 4:
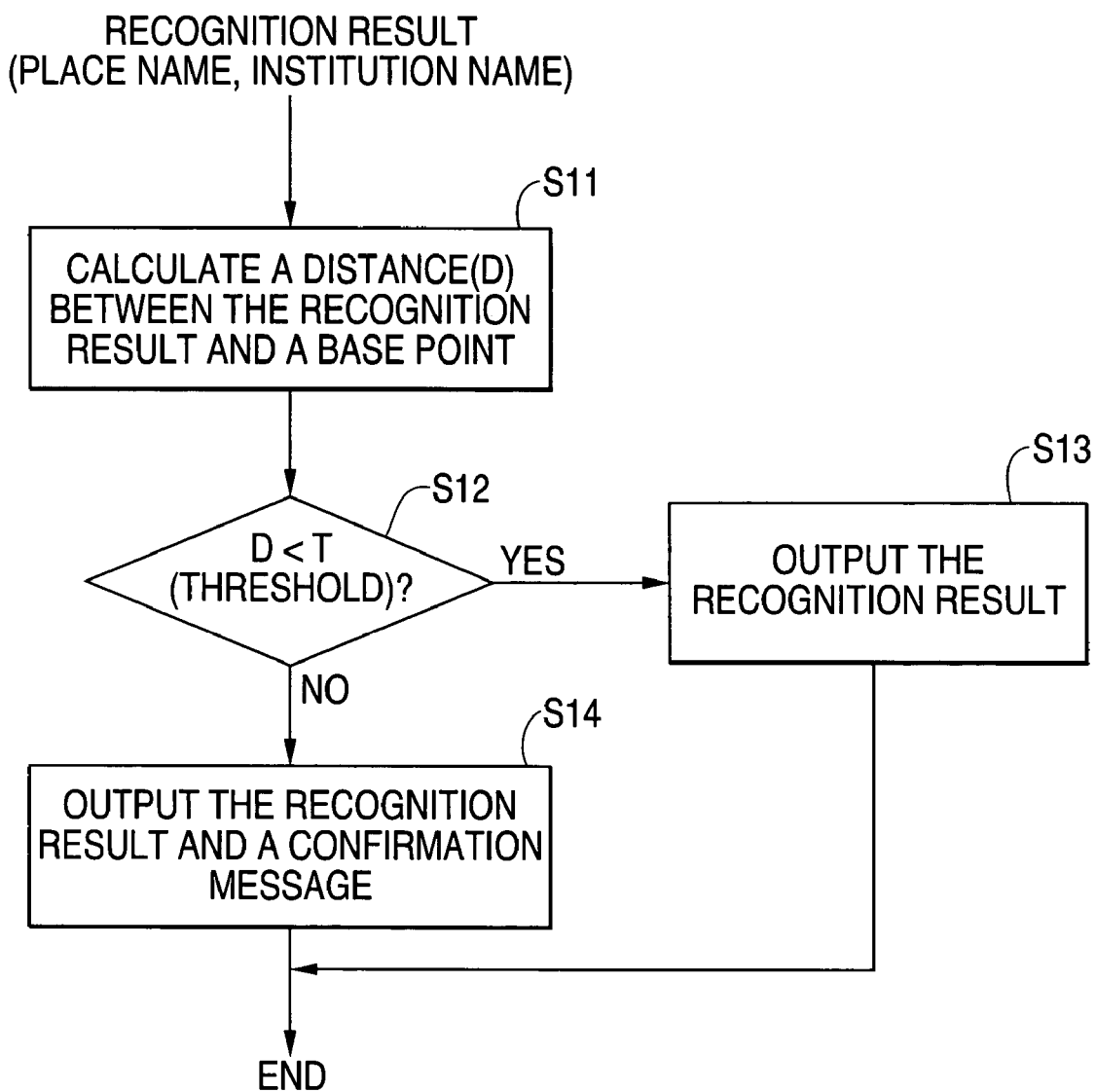
FIG. 4 is a flow chart of processing of a response generation section in the speech recognition support apparatus according to the first embodiment of the present invention.

The response generation section 16 accepts the one recognition result from the speech recognition section 15, and generates a response to the user. FIG. 2 is a map including a plurality of place names and the base point on the display section 12. FIG. 3 is a correspondence table to store the place name and the position coordinate for the plurality of place names on the map in FIG. 2. The response generation section 16 previously stores the correspondence table in FIG. 3. FIG. 4 is a flow chart of processing of the response generation section 14 according to the first embodiment.

First, the distance decision section 160 in the response generation section 16 retrieves a position coordinate of the base point and a position coordinate of the place name from the recognition result from the correspondence table shown in FIG. 3. Then, the distance decision section 160 calculates a distance D between two position coordinates of the base point and the place name (step S11). Next, the distance decision section 160 compares the distance D with a threshold T in order to decide whether the place position of the recognition result is far from the base point (step S12). In case of "D<T", the place position is decided to be near the base point, and a distance decision flag DF representing the decision result is set as the first status. In this case, the response generation section 16 outputs the recognition result without a confirmation message to the control section 13 according to the first status of the distance decision flag DF (step S13). On the other hand, in case of "D≧T", the place position is decided to be far from the base point, and the distance decision flag DF is set as the second status. In this case, the response generation section 16 generates the confirmation message to confirm the recognition result for the user according to the second status of the distance decision flag DF, and outputs the recognition result with the confirmation message to the control section 13 (step S14). For example, the confirmation message is "Did you say ○○?" (○○: the recognition result). Furthermore, in case of failure of the recognition result, the response generation section 14 informs the purport (the failure of the recognition result) to the control section 13.

In case of accepting the recognition result with the confirmation message from the response generation section 16, the control section 13 presents the confirmation message to the user through the display section 12 or a speaker (not shown in FIG. 1) and waits for the user's decision (confirmation). The user inputs "correct or incorrect" for the recognition result by a button operation. In case the user inputs "incorrect" for the recognition result, the control section 13 urges the user to utter again through the display section 12 or the speaker. In case the user inputs "correct" for the recognition result, the control section 13 executes the operation corresponding to the recognition result. On the other hand, in case of accepting the recognition result without the confirmation message from the response generation section 16, or accepting the failure of the recognition result, the control section 13 executes the operation corresponding to the notification without the user's confirmation.

In the above-mentioned embodiment, object vocabulary of speech recognition includes the position coordinate on the map. However, in general, the object vocabulary of speech recognition does not include the position coordinate such as control command name of system. Therefore, in the speech recognition system shown in FIG. 1, in order to cope with the case that the recognition result is the vocabulary not including the position coordinate, a position coordinate flag PF is attached to all vocabulary of a recognition result as an attribute of the vocabulary. The position coordinate flag PF represents whether the vocabulary includes the position coordinate on the map. The speech recognition section 15 outputs the recognition result with the position coordinate flag PF to the response generation section 16. First, the distance decision section 160 in the response generation section 16 checks the position coordinate flag PF attached to the recognition result, and decides whether the vocabulary of the recognition result includes the position data. If the vocabulary does not include the position data, the distance decision section 160 regards "D≧T" (concretely, D=T) and sets the distance decision flag DF as the second status. In this case, as shown in FIG. 4, the response generation section 16 outputs a pair of confirmation messages and the recognition result to the control section 13. Furthermore, reversely, the distance decision section 160 may regard "D<T" (concretely, D=0) and may set the distance decision flag DF as the first status. In this case, the response generation section 16 outputs the recognition result to the control section 13. Furthermore, a decision of "D≧T(D=T)" or "D<T(D=T)" may be determined by internal status of the car navigation system.

Next, the speech recognition system according to the second embodiment of the present invention is explained. In the first embodiment, the speech recognition section 15 outputs one recognition result only. However, in the second embodiment, the speech recognition section 15 outputs a plurality of recognition candidates as the speech recognition result. In addition to this, the response generation section 16 and the control section 13 execute a new function corresponding to output function of the plurality of recognition candidates of the speech recognition section 15.

Figure 5:
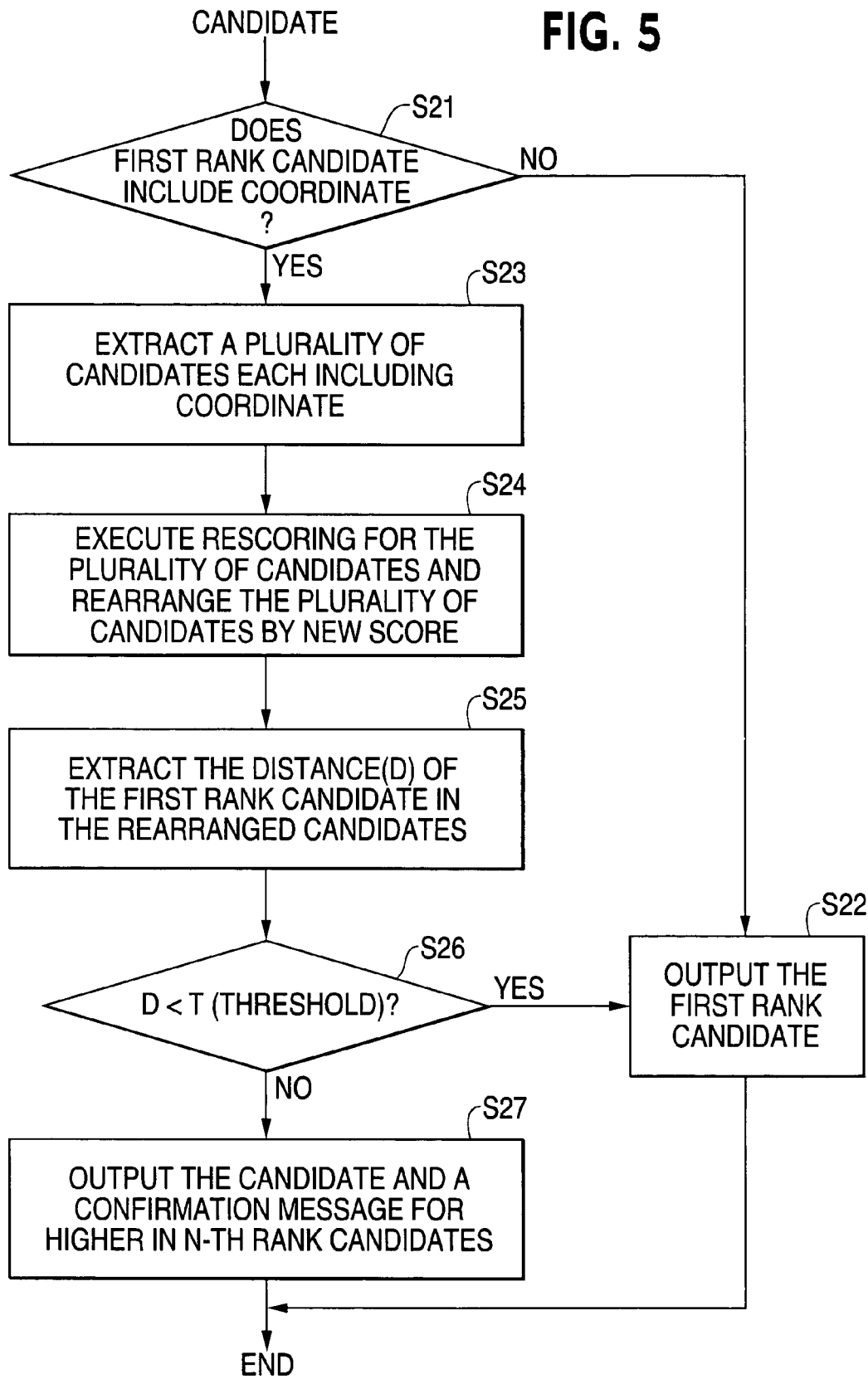
FIG. 5 is a flow chart of processing of a response generation section in the speech recognition support apparatus according to a second embodiment of the present invention.

Hereinafter, as the operation of the speech recognition system of the second embodiment, processings of the response generation section 16 and the control section 13 are mainly explained. FIG. 5 is a flow chart of processing of the response generation section 16. Assume that the speech recognition section 15 outputs a plurality of recognition candidates as the recognition result to the response generation section 16. As for each recognition candidate, a comparison score S and the position data flag PF are attached. The comparison score S is an evaluation value (pattern matching result) representing a similarity degree or a distance between the input speech (feature pattern sequence) and the candidate (standard feature pattern). The position data flag PF represents whether the candidate includes the position coordinate.

First, the distance decision section 160 in the response generation section 16 decides whether the recognition candidate of the highest evaluation value (first rank candidate) includes a position coordinate according to the position data flag PF (step S21). If the first rank candidate does not include the position coordinate, the response generation section 16 outputs the first rank candidate as the recognition result to the control section 13 (step S22), and executes the processing in the same way as in the first embodiment. On the other hand, if the first rank candidate includes the position coordinate, the distance decision section 160 extracts the candidates each including the position coordinate from the plurality of the recognition results (step S23). Then, the distance decision section 160 calculates a distance D between the base point and a place position of each extracted candidate, and calculates a new score S' based on the distance D and the comparison score S as follows.

$$S' = \alpha S + \beta G(D) \tag{1}$$

The distance decision section 160 rearranges the extracted candidates (change of ranking of candidates) in order of higher score S' (step S24). In above equation (1), "α, β" represent coefficients experimentally determined, and "G(D)" represents a monotonous decrement function or a monotonous unincrement function for D. As for rearrangement of the candidates at step S24, in case of "α=0, β>0, G(D): monotonous decrement function", the candidates are arranged in order of nearness to the base point on the map. In case of "α>0, β=0", the calculation of the score S' is not executed. The above-equation (1) is not necessarily used to calculate the score S'. The score S' may be calculated according to at least the distance D and the score S. After rearranging the candidates by the score S', the distance decision section 160 extracts one candidate of the highest score S' (a first rank candidate) from the rearranged candidates (step S25), and compares the distance D of the first rank candidate with a threshold T in order to decide far and near the base point (step S26). In case of (D<T), the distance decision flag DF is set as the first status. In case of (D≧T), the distance decision flag DF is set as the second status.

In case of (D<T), the response generation section 16 outputs the first rank candidate to the control section 13 (step S22). On the other hand, in case of (D≧T), the response generation section 16 extracts N units of candidates from first rank to N-th rank from the rearranged candidates (N: predetermined natural number). In this case, if the number of the rearranged candidates is below N, the response generation section 16 extracts all rearranged candidates. Then, the response generation section 16 outputs each extracted candidate along with the confirmation message to the control section 13 (step S27). In case of accepting a failure of recognition from the speech recognition section 15, the response generation section 16 informs the purport of the failure of recognition to the control section 13.

Figure 6:
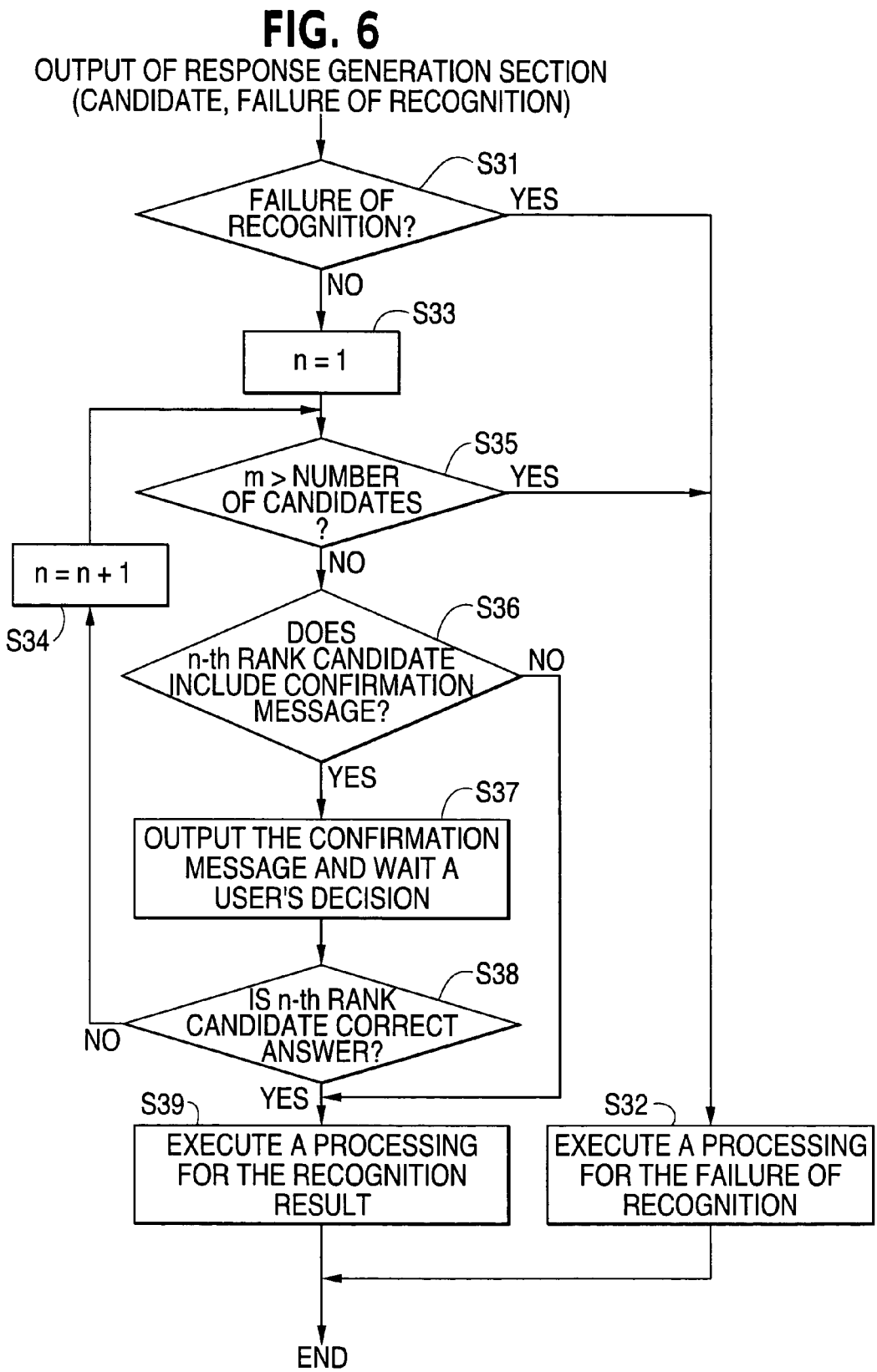
FIG. 6 is a flow chart of processing of a control section in the speech recognition support apparatus according to the second embodiment of the present invention.

FIG. 6 is a flow chart of processing of the control section 13 according to the second embodiment. The control section 13 executes the processing corresponding to a notification from the response generation section 16. First, the control section 13 decides whether the notification from the response generation section 16 is the failure of recognition (step S31). In case of a failure of recognition, the control section 13 executes the processing for the failure of recognition (step S32). On the other hand, in case of a non-failure of recognition, the control section 13 sets the order number n representing ranking of candidate by initial value 1 (step S33). In case that "n" is not above the number of candidates (step S35), the control section 13 checks whether n-th rank candidate includes the confirmation message (step S36). If the n-th rank candidate does not include the confirmation message, the control section 13 executes the processing for the recognition result of the n-th rank candidate (step S39).

The n-th rank candidate not including the confirmation message is the first rank candidate output from the response generation section 16 at step S22 in FIG. 5. On the other hand, if the n-th rank candidate includes the confirmation message, the control section 13 presents the confirmation message to the user through the display section 12 or the speaker, and waits for the user's confirmation (decision) (step S37). The candidate including the confirmation message exists in case that the response generation section 16 outputs N units of candidates of higher score and the confirmation message.

As for presentation of the confirmation message to the user, if the user inputs "correct" for the n-th rank candidate, the control section 13 executes the processing for the n-th rank candidate as the recognition result (step S38, S39). On the other hand, if the user inputs "incorrect" for the n-th rank candidate, the control section 13 increments the number "n" by 1 (step S38, 34) and checks whether the incremented value of "n" is above the number of candidates (step S35). If the incremented value of "n" is not above the number of candidates, the control section 13 executes the processing following step S36 for the n-th candidate with the confirmation message. In this way, if N units of candidates of higher score and the confirmation message are supplied from the response generation section 16, the control section 13 repeatedly presents the confirmation message for each candidate in order of high rank to the user untill the user inputs "correct" for one candidate. When the user inputs "correct" for the n-th candidate during presenting, the control section 13 executes the processing for the n-th candidate as the recognition result. Furthermore, if the user does not input "correct" for all of the presented candidates (step S35), the control section 13 executes the processing in the same way of the failure of recognition (step S32).

Next, the speech recognition system according to the third embodiment of the present invention is explained. In general, in the car-navigation system, a scale of the map on the display is variable. In this kind of system, a predetermined area is magnified or reduced by the user's indication or a control of the car-navigation system. In case of utterance input from the user, the user often speaks the place name or the institution name of the position in the predetermined area. In this case; in spite of change of scale of the displayed map, if the coordinate of the base point is not changed, a correct decision of far and near between the base point and the recognition point is difficult. In the third embodiment, in case of change of scale of the displayed map, the correct decision of far and near is possibly executed. In this case, functions of the base point set section and the response generation section are partially different from the speech recognition system of the first embodiment. However, for convenience' sake, the block diagram shown in FIG. 1 is used.

Hereinafter, as for the operation of the speech recognition system of the third embodiment, the car-navigation system to display the map by variable scale is explained. Especially, the operations of the base point set section 14 and the response generation section 16 are mainly explained.

First, by indication of the user or the control of the car-navigation system, assume that the scale of the map is changed to magnify the predetermined area. The base point set section 14 sets a center point on the magnified map as the base point. Then, the distance decision section 160 in the response generation section 16 obtains the magnification ratio M of the map from the control section 13, and sets a threshold T based on the magnification ratio M as follows.

$$T = F(M) \quad (2)$$

In above equation (2), F(M) is a monotonous unincrement function. In short, the larger the magnification ratio M is, the narrower the predetermined area on the map is. In this situation, assume that the user utters his desired place name (or the institution name) on the map. The recognition result of his utterance is supplied from the speech recognition section 15 to the response generation section 16. In this case, in order to briefly explain, assume that one recognition result is supplied. The distance decision section 160 in the response generation section 16 calculates a distance D between a place point of the recognition result and a base point on the map, and compares the distance D with the threshold T to decide far and near of the place point from the base point. Apparently, in case of "D>T", the place point is decided to be far from the base point.

In the third embodiment, in the car-navigation system to display the map by variable magnification ratio, the case of variably setting the threshold based on the magnification ratio M is explained. However, the third embodiment is not limited to this case. For example, a base area to decide far and near is taken into consideration. The base area is regarded as object area to unconditionally retrieve and variably set based oh the magnification ratio M.

The place point of the recognition result may be decided to be included in the base area in order to decide far and near of the place point from the base point. In this case, the base area is set by the base point as a center position. Furthermore, predetermined parameter representing a standard (threshold, base area) of decision of far and near may be used instead of the magnification ratio M.

In above-mentioned embodiments, the distance D between the place point of the recognition result and the base point is calculated as Euclid distance based on two coordinate values. However, this distance D is used for the decision of far and near of the place point from the base point. Therefore, the distance D is not limited to Euclid distance and may be a measure representing far and near between two place points. In the fourth embodiment, as a distance D between the place point of the recognition result and the base point, the measure representing far and near between two place points is used. The speech recognition system according to the fourth embodiment is explained by referring to FIG. 1 for convenience' sake.

Figure 7:
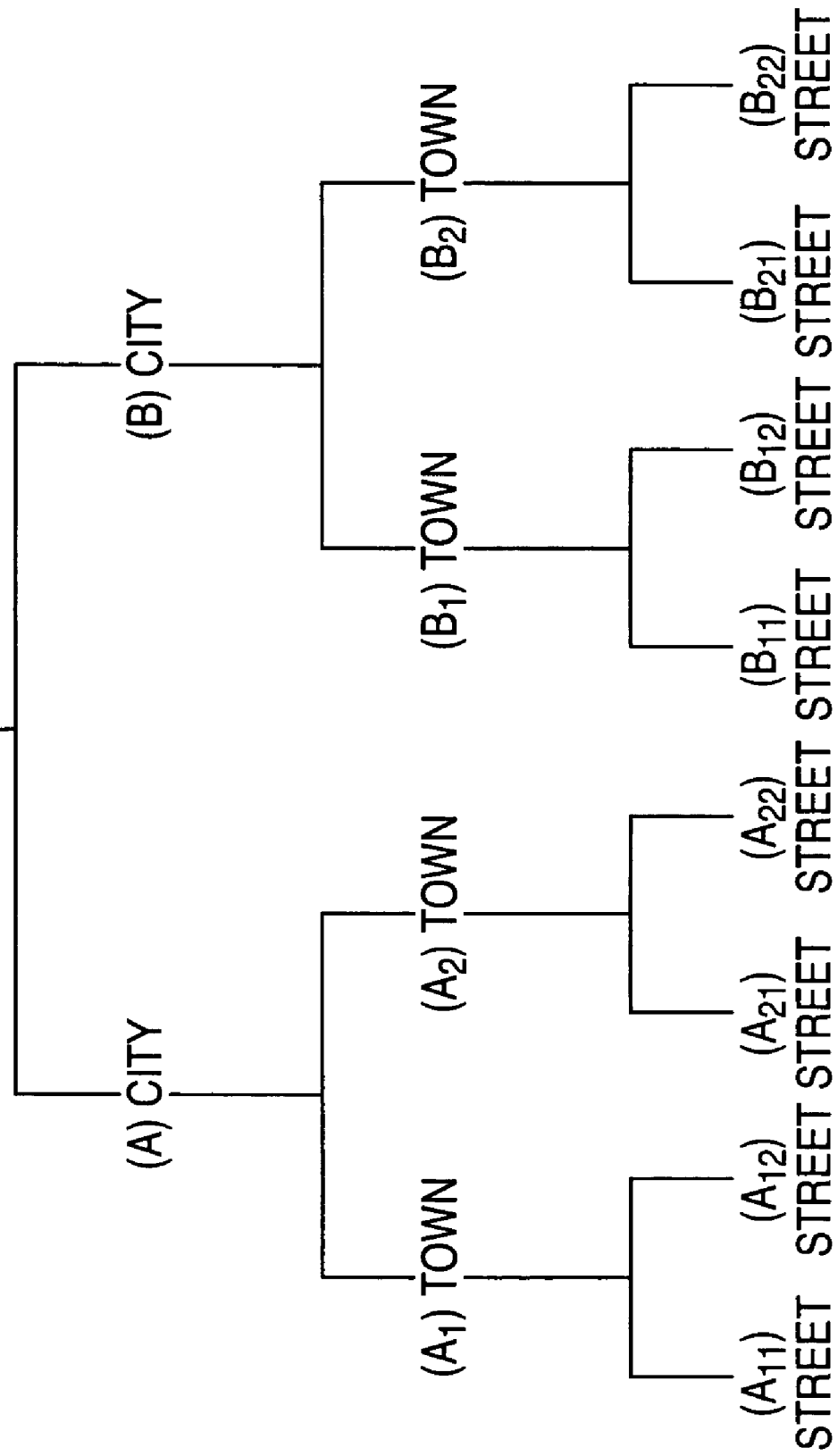
FIG. 7 is a schematic diagram of a data structure in which a plurality of place names are hierarchically arranged from state level to street level.

First, in the fourth embodiment, vocabularies of recognition object including the position coordinate are hierarchically arranged from high level to low level. Concretely, these vocabularies of place name are hierarchized in order of level such as state, city, town, street. FIG. 7 is a schematic diagram of the place names hierarchized as a tree structure according to the fourth embodiment. As shown in FIG. 7, if the place name is a city name, a state name to which the place name belongs is decided. If the place name is a town name, a city name and a state name to which the place name belongs are decided. If the place name is a street name, a town name, a city name and a state name to which the place name belongs are decided. Furthermore, if a coordinate of the present position of the car is obtained from GPS, a street near the coordinate is determined by calculating a distance between the street and the present position. A town and a city to which the street belongs are decided as the place position to which the base point belongs. In the fourth embodiment, the distance decision section 160 in the response generation section 16 does not actually calculate a distance D between the base point and a place position of the recognition result. If the base point and the place position of the recognition result belong to same city, the distance decision section 160 sets the distance D as "0" (D=0). If the base point and the place position of the recognition result do not belong to the same city, the distance decision section 160 sets the distance D as "T" (D=T, T: a threshold to decide far or near). Accordingly, in case of "D=T", the response generation section 16 generates a confirmation message according to steps S12 and S14 in FIG. 4. On the other hand, in case of "D=0", the response generation section 16 outputs the recognition result without the confirmation message according to steps S12 and S13 in FIG. 4.

In the fourth embodiment, the decision of far or near by the distance decision section 160, i.e., a comparison between the distance D and the threshold T, is equally defined to decide whether the base point and the recognition result belong to the same city. Accordingly, in order to decide far and near of the recognition result, the distance decision section 160 may decide whether the base point and the recognition result belong to the same city without setting the distance D as "0" or "T".

Furthermore, in the fourth embodiment, it may be decided whether the base point and the recognition result belong to same town or same street. However, in case of using the same town name, if the recognition result is a city name, it is not decided whether the base point and the recognition result belong to the same town name. In short, if the recognition result is a vocabulary of higher level than the base point, the decision of far and near of the recognition result is impossible. Therefore, in this case, it is determined that the base point and the recognition result do not belong to one level area representing the same place name. In short, a place position of the recognition result is decided to be far from the base point (D=T), and the response generation section 16 generates the confirmation message.

Furthermore, as shown in FIG. 7, a state whose level is higher than city (for example, New York state, California state) may be used. Alternatively, a place name of level different from well known geographical unit or public administration unit may be used in order to decide far and near of the recognition result.

In the fourth embodiment, for example, the basis to decide far or near of the recognition result is previously determined as city name. However, different basis is selectively used by the recognition result. Therefore, as a modification of the fourth embodiment, the basis to decide far and near is selectively set by the recognition result. In this case, the highest level of place name is state as shown in FIG. 7. First, if the recognition result from the speech recognition section 15 is a state name, the distance decision section 160 unconditionally sets as "D=T". In short, a place name (or an institution name) of the recognition result is decided to be far from the base point. Then, the response generation section 16 generates the confirmation message. Second, if the recognition result is a city name and the base point is a state name, it is decided whether a state name to which the city name of the recognition result belongs is the same as the base point. Third, if the recognition result is a town name and the base point is a city name, it is decided whether a city name to which the town name of the recognition result is the same as the base point. In short, the distance decision section 160 decides whether a place name of one higher level for the recognition result is the same as a place name of the base point.

Furthermore, the basis of decision may be changed by unit of the recognition vocabulary or category. For example, "○○ amusement park" is the vocabulary of city level, "X X gas station, □□ town store" is the vocabulary of town level. In addition to this, the distance D is unconditionally set as "T" or "O" according to the vocabulary. This change of the basis of decision is realized by attaching the attribute to indicate the basis of decision to the recognition vocabulary.

Figure 8:
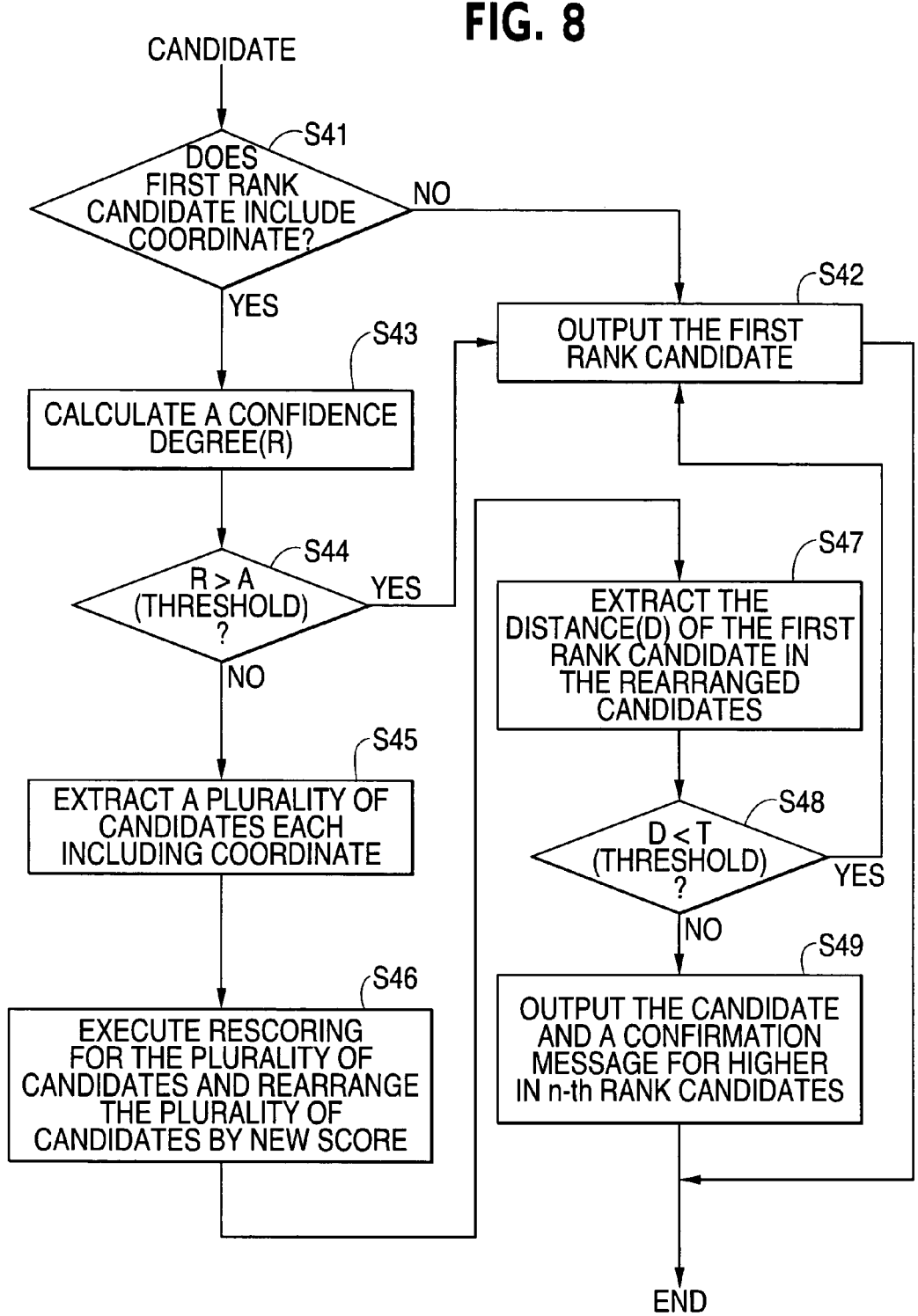
FIG. 8 is a flow chart of processing of the response generation section in the speech recognition support apparatus according to a fifth embodiment of the present invention.

In the above-mentioned embodiments, as for the recognition result including the position coordinate, the distance decision section 160 determines far or near for the recognition result except for the case that the decision result is unconditionally determined. However, if the recognition result is sufficiently reliable irrespective of a distance from the base point, the confirmation message should not be presented to the user in order to avoid an unnecessary confirmation operation by the user. Therefore, in the fifth embodiment, a generation of the confirmation message is controlled according to a confidence degree of the recognition result. The operation of the speech recognition system of the fifth embodiment is explained by referring to FIG. 1 for convenience' sake. FIG. 8 is a flow chart of processing of the response generation section 16 according to the fifth embodiment.

Assume that the speech recognition section 15 supplies a plurality of recognition candidates as the recognition result to the response generation section 16. Each recognition candidate includes a comparison score S, a length (time) T of the input speech, and a position data flag PF. The comparison score S is an evaluation value representing a similarity degree or a distance between the input speech (feature pattern sequence) and the candidate (standard feature pattern). The position data flag PF represents whether the candidate includes the position coordinate on the map.

First, the distance decision section 160 in the response generation section 16 decides whether the candidate of the highest evaluation value (first rank candidate) includes the position coordinate according to the position data flag PF (step S41). If the first rank candidate does not include the position coordinate, the response generation section 16 outputs the first rank candidate to the control section 13 in the same way as in step S22 in FIG. 5 (step S42). On the other hand, if the first rank candidate includes the position coordinate, the distance decision section 160 calculates a confidence degree R of the first rank candidate (step S43). Hereinafter, calculation of the confidence degree R is explained.

The comparison score S of the recognition result obtained by the speech recognition section 15 is accumulative value by unit of time (for example, frame period). In short, the confidence degree R is not simply determined by the comparison score S only. Accordingly, the confidence degree R of the first rank candidate is calculated as follows.

$$R = S/T \quad (3)$$

In the above equation (3), "T" represents a length (time) of input speech of the recognition object. The length T and the score S are supplied from the speech recognition section 15. The calculation of the confidence degree R according to the equation (3) is executed by the distance decision section 160, but may be executed by the speech recognition section 15. After calculating the confidence degree R of the first rank candidate, the distance decision section 160 compares the confidence degree R with the threshold A, and decides whether the first rank candidate is reliable (step S44).

In case of "(R>A)", the distance decision section 160 decides that the first rank candidate is sufficiently reliable. In this case, the response generation section 16 does not generate the confirmation message, and outputs the first rank candidate only to the control section 13 in the same way as when the recognition result does not include the position coordinate or as when the distance D between the recognition result and the base point is below the threshold (step S42).

On the other hand, in case of "(R≦A)", the distance decision section 160 decides that the first rank candidate is not reliable. In this case, the distance decision section 160 executes the decision of far or near for the recognition result in the same way as in steps S23~S26 in FIG. 5 of the second embodiment (step S45~S48). In short, the distance decision section 160 decides whether to generate a confirmation message.

In the above-mentioned embodiments, each function of the control section 13, the base point set section 14, the speech recognition section 15, and the response generation section 16 may be realized as software.

Furthermore, in the above-mentioned embodiments, the steps applied to the speech recognition system may be put into operation as a computer-readable medium (such as a CD-ROM) to store a program executed by the computer. In this case, the steps include a decision processing of far and near of the recognition result, a generation processing of the confirmation message by the response generation section 16, and a presentation processing of the confirmation message to the user by the control section 13. The program stored in the computer-readable medium makes the computer function as the predetermined means in the speech recognition system, or makes the computer realize the predetermined function in the speech recognition system. Furthermore, this program may be downloaded through a communication medium.

As mentioned-above, in the present invention, in case that a place point of the recognition result for the user's input speech is decided to be far from the base point on the map, the confirmation message to confirm whether the recognition result is correct is presented to the user and depends on the user for help. Therefore, in order to indicate the place name or the institution name located on the map, the vocabularies by the user's utterance are not limited. In short, retrieval object area is not limited, unnecessary operation by erroneous recognition is avoided, and a condition for the user to utilize the speech recognition system is improved.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A speech recognition support method applied to a system to retrieve a map in response to a user's input speech, comprising the steps of:

assigning a recognition result to the user's input speech;

calculating, if the recognition result of the user's input speech represents a point on the map, a distance between the point and a base point on the map;

deciding whether the distance is above a threshold; and outputting, if the distance is above the threshold, an inquiry to confirm whether the recognition result is correct.

2. The speech recognition support method according to claim 1, further comprising the step of:

if the distance is not above the threshold, outputting the recognition result without the inquiry.

3. The speech recognition support method according to claim 1, further comprising the step of:

if the recognition result is a vocabulary not including a position coordinate on the map, outputting at least the recognition result.

4. A speech recognition support apparatus for retrieving a map in response to a user's input speech, comprising:

a speech recognition unit configured to assign a recognition result to the user's input speech;

a distance decision unit configured to calculate a distance between a point of the recognition result and a base point on the map if the recognition result represents a point on the map, and to decide whether the distance is above a threshold; and a response generation unit configured to generate an inquiry to confirm whether the recognition result is correct if the distance is above the threshold.

5. A computer readable memory containing computer readable instructions in a system to retrieve a map in response to a user's input speech, comprising:

instruction means for causing a computer to assign a recognition result to the user's input speech;

instruction means for causing a computer to calculate, if the recognition result of the user's input speech represents a point on the map, a distance between the point and a base point on the map;

instruction means for causing a computer to decide whether the distance is above a threshold; and instruction means for causing a computer to output, if the distance is above the threshold, an inquiry to confirm whether the recognition result is correct.

* * * * *